US012728562B2

(12) United States Patent
Englander et al.

(10) Patent No.: US 12,728,562 B2
(45) Date of Patent: Sep. 8, 2026

(54) METHOD AND APPARATUS FOR DRY MANUFACTURING RIGID CELLULOSE PRODUCTS

(71) Applicant: Yangi AB, Varberg (SE)

(72) Inventors: Maria Englander, Lindome (SE); Anna Altner, Veddinge (SE)

(73) Assignee: Yangi AB, Varberg (SE)

( * ) Notice: Subject to any disclaimer, the term of this patent is extended or adjusted under 35 U.S.C. 154(b) by 210 days.

(21) Appl. No.: 18/290,262

(22) PCT Filed: May 11, 2022

(86) PCT No.: PCT/EP2022/062790
§ 371 (c)(1),
(2) Date: Nov. 10, 2023

(87) PCT Pub. No.: WO2022/238484
PCT Pub. Date: Nov. 17, 2022

(65) Prior Publication Data

US 2024/0239008 A1 Jul. 18, 2024

(30) Foreign Application Priority Data

May 12, 2021 (SE) .................................... 2150605-0

(51) Int. Cl.
*B27N 5/00* (2006.01)
*B27N 1/00* (2006.01)

(52) U.S. Cl.
CPC *B27N 5/00* (2013.01); *B27N 1/00* (2013.01)

(58) Field of Classification Search
CPC ............ B27N 3/16; B27N 3/12; B31B 50/741
See application file for complete search history.

(56) References Cited

U.S. PATENT DOCUMENTS 5,643,384 A * 7/1997 Okabe .................. B31B 50/592
156/224
6,617,490 B1 9/2003 Chen et al.
(Continued)

FOREIGN PATENT DOCUMENTS

DE 2364025 A1 6/1975
GB 2096195 A 10/1982
(Continued)

OTHER PUBLICATIONS

International Search Report and Written Opinion for International Application No. PCT/EP2022/062790, dated Sep. 15, 2022, 11 pages.

*Primary Examiner* — Virak Nguon
(74) *Attorney, Agent, or Firm* — Buchanan Ingersoll & Rooney PC

(57) ABSTRACT

A method for dry manufacturing rigid cellulose products having an essentially non-flat general shape from cellulose fibres comprising the steps of: providing a quantity of separated cellulose fibres from a dry cellulose raw material in at least one separating unit, providing the separated cellulose fibres onto a support structure for forming a cellulose blank, producing the rigid cellulose product having essentially non-flat general shape by pressing the cellulose blank in a product forming unit having a moulding tool for forming the rigid cellulose product, by means of at least one imprinting tool before the step of producing the rigid cellulose product, imprinting the cellulose blank by providing an imprinted pattern onto the cellulose blank to increase internal bonding between individual cellulose fibres at the location of the imprinted pattern to prevent mutual separation of the individual cellulose fibres during the pressing of the cellulose blank in the product forming unit.

14 Claims, 7 Drawing Sheets

(56) References Cited

U.S. PATENT DOCUMENTS

| | | | |
|---|---|---|---|
| 2019/0070819 A1* | 3/2019 | Larsson | B29C 49/0005 |
| 2019/0118426 A1 | 4/2019 | Larsson et al. | |
| 2021/0087727 A1 | 3/2021 | Yoshioka et al. | |
| 2022/0339900 A1* | 10/2022 | Moessnang | B65B 47/06 |

FOREIGN PATENT DOCUMENTS

| | | | |
|---|---|---|---|
| JP | 2001277380 | A * | 10/2001 |
| WO | 2014142714 | A1 | 9/2014 |
| WO | 2019209160 | A1 | 10/2019 |

* cited by examiner

METHOD AND APPARATUS FOR DRY MANUFACTURING RIGID CELLULOSE PRODUCTS

CROSS-REFERENCE TO RELATED APPLICATIONS

This application is the U.S. National Phase of International Application No. PCT/EP2022/062790, filed May 11, 2022, which claims priority to Swedish Application No. 2150605-0, filed May 12, 2021. The disclosure of each of these applications is incorporated herein by reference in its entirety for all purposes.

TECHNICAL FIELD OF THE INVENTION

The present invention relates in general to the field of method and apparatus for dry manufacturing of rigid cellulose products having essentially non-flat general shape. The cellulose products may be used for packaging, storing, transporting and/or displaying other products such as electronics, tools, jewelry, food, dairy products, cosmetics, etc., and/or may be used as single/multiple use disposable articles. The present invention also relates to a rigid cellulose product.

BACKGROUND OF THE INVENTION

There are many situations where it is desirable to provide two-dimensional (2D) or three-dimensional (3D) shaped objects made of sustainable materials. A material commonly used for packaging inserts is wet moulded pulp. Wet moulded pulp has the advantage of being considered as a sustainable packaging material, since it is produced from biomaterials and can be recycled after use. Consequently, moulded pulp has been quickly increasing in popularity for both primary and secondary packaging applications (packaging next to the article and assembly of such packages).

A common disadvantage with all wet-forming techniques is the need for large amounts of water during manufacturing and the need for drying of the moulded product, which is a time and energy consuming step leading to low production speed and substantial high investment cost in machines and tooling. Meaning that the technology will not be feasible to replace fossil-based alternatives in large scale.

Moreover, many modern lean production lines require in-line on-demand package or component manufacturing where a wet-forming process is not preferred or feasible. Lately, new fibre-based materials have been developed with the purpose of enabling dry forming of three-dimensional objects/products. One approach is disclosed by WO2014/142714. WO2014/142714 discloses a dry-laid composite web being an intermediate product for thermoforming of three-dimensionally shaped objects, comprising 40-95 wt-% CTMP fibres, 5-50 wt-% thermoplastic material, and 0-10 wt-% additives, wherein the dry-laid composite web has been impregnated with a dispersion, an emulsion, or a solution containing the thermoplastic material, polymer, and dried, obtaining a density of 50-250 kg/m3, or, if compressed by calendaring 400-1000 kg/m3. According to WO2014/142714, bonding of the polymer is activated by the higher temperature applied in the thermoforming process and contributes to the final strength of the thermoformed object.

WO2019209160 discloses a method for producing a cellulose product from a multi-layer structure where the multilayer structure may consist of one layer of dry laid cellulose fibers combined with one or more prefabricated tissue layers. The problem associated with WO2019209160 is that it is a complex and expensive manufacturing method resulting in mediocre product quality as there is more or less always unwanted wrinkles in the final product as a result of the multilayer blank structure. Furthermore, the prefabricated tissue layers add significant cost to the final product.

A common problem in the pressing step for forming a 3D shaped component/product is that the sheet/blank of cellulose fibres may crack due to complex component structure/design and/or deep products.

There is a need in the art for a more reliable dry cellulose forming/manufacturing process of essentially non-flat rigid cellulose products which reduce or eliminates the risk of creating cracks during the pressing step.

OBJECT OF THE INVENTION

The present invention aims at obviating the aforementioned and other disadvantages and failings of previously known methods and apparatus for dry manufacturing rigid cellulose products, and at providing an improved method and apparatus for dry manufacturing rigid cellulose products having essentially non-flat general shape.

A primary object of the present invention is to provide an improved method and apparatus for dry forming/manufacturing rigid cellulose products having essentially non-flat general shape from cellulose fibres. It is another object of the present invention to provide a method and apparatus for manufacturing rigid cellulose products that entails that the produced cellulose products are free from cracks that otherwise originate from the pressing of the cellulose product.

SUMMARY OF THE INVENTION

According to the invention at least the primary object is attained by means of the initially defined method and apparatus having the features defined in the independent claims. Preferred embodiments of the present invention are further defined in the dependent claims.

According to a first aspect of the present invention, there is provided a method for dry manufacturing rigid cellulose products having essentially non-flat general shape from cellulose fibres, the method comprising the steps of:

- providing a quantity of separated cellulose fibres from a dry cellulose raw material in at least one separating unit,
- providing the separated cellulose fibres onto a support structure for forming a cellulose blank,
- producing said rigid cellulose product having essentially non-flat general shape by pressing said cellulose blank in a product forming unit having a molding tool for forming said rigid cellulose product, wherein said method further comprises the step of:

- imprinting said cellulose blank by providing an imprinted pattern onto the cellulose blank by means of at least one imprinting tool before the step of producing the rigid cellulose product having essentially non-flat general shape.

According to a second aspect of the present invention, there is provided an apparatus comprising:

- a disintegrating unit for providing a quantity of separated cellulose fibres from a cellulose raw material in dry state,
- a support structure configured for receiving the separated cellulose fibres and for forming a cellulose blank from the separated cellulose fibres, a product forming unit having a molding tool for producing said rigid cellulose product having essentially non-flat general shape by pressing said cellulose blank, wherein said apparatus further comprises:

at least one an imprinting tool for imprinting said cellulose blank by providing an imprinted pattern onto the cellulose blank, wherein the at least one imprinting tool is located upstream the product forming unit.

Thus, the present invention is based on the insight of providing partially compressed/imprinted locations to the cellulose blank such that at the partially compressed/imprinted locations there is an increased internal bonding between individual cellulose fibres preventing mutual separation/displacement of cellulose fibres during the pressing step that otherwise might lead to cracks in the final rigid cellulose product. At the same time, the locations of the cellulose blank not being partially compress/imprinted have less internal bonding between individual cellulose fibres entailing that such locations are more formable during the pressing step.

An advantage of the present invention is that the method and apparatus provide appropriate/tailored strength and rigidity to the cellulose blank prohibiting the same to crack when producing/pressing said rigid cellulose product having essentially non-flat general shape.

Another advantage of the present invention is that the transportation of the cellulose blank before/into the product forming unit and pressing step is simplified since the at least partially imprinted cellulose blank has increased internal bonding.

According to various example embodiments of the present invention said method further comprises the step of heating said molding tool while producing said rigid cellulose product, and/or heating said cellulose blank prior to producing said rigid cellulose product, and/or heating said imprinting tool.

The advantage of these embodiments is that the manufacturing method is flexible in the way said cellulose blank is heated to a desired temperature for producing the rigid cellulose product having essentially non-flat general shape. Another advantage of these embodiments is that the imprinting may be even more efficient if the imprinting tool is heated while performing the imprinting.

According to various example embodiments of the present invention said imprinted pattern covers equal to or more than 10% and equal to or less than 70% of the total area of the cellulose blank.

The advantage of these embodiments is that there is a great degree of flexibility of generating imprinting pattern for achieving desired result at desired areas of the cellulose blank.

According to various example embodiments of the present invention said imprinted pattern is evenly distributed over the area of the cellulose blank covered by the imprinted pattern.

The advantage of these embodiments is the simplicity of providing the imprinted pattern without the need of taking into account the final shape and/or orientation of the rigid cellulose product.

According to various example embodiments of the present invention said imprinted pattern is provided only on predetermined areas of the cellulose blank corresponding to crack prone areas of the pressed rigid cellulose product during the step of producing the rigid cellulose product having essentially non-flat general shape.

The advantage of these embodiments is that strength (locally increased internal bonding) to the cellulose blank may be applied to areas of the cellulose blank that are prone to crack during the subsequent pressing step, and at the same time the rest of the cellulose blank may easy change from its original shape to the final non-flat general shape due to lower internal bonding.

According to various example embodiments of the present invention the thickness of the imprinted pattern is equal to or more than 20% and equal to or less than 70% of the maximum/total thickness of the cellulose blank.

The advantage of these embodiments is that one may provide an imprinting of the cellulose blank at the same time as providing a sufficient compressing of the reminder of the cellulose blank.

According to a third aspect of the present invention, there is provided a rigid cellulose product produced by said inventive method, wherein the rigid cellulose product comprises cellulose fibres from a cellulose raw material constituted by virgin cellulose fibres and/or recycled cellulose fibres, wherein the cellulose fibres originate from wood pulps such as kraft pulp, sulphite pulp, mechanical pulp, thermomechanical pulp, chemical treated mechanical pulp, chemi-thermomechanical pulp, and/or from non-wood pulps such as bagasse, bamboo, abaca, hemp, flax, cotton.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

As used herein, the term "air/dry moulding/forming or air/dry laying" means a well-known method according to which separated cellulose fibres are formed into a cellulose blank/sheet.

In air-laying small/short fibres having a normal length in the range of 0.5 to 70 mm, for instance 1 to 50 mm, are separated and captured by an air stream/flow, and then laid on/applied to a forming mesh/surface, usually using a vacuum/low pressure at the other side of the mesh/surface. The terms "air/dry laying" and "air/dry moulding" are used interchangeably herein. The cellulose fibre carrying air flow may be generated by suitable device located upstream and/or downstream the forming mesh/surface.

Figure 1A:
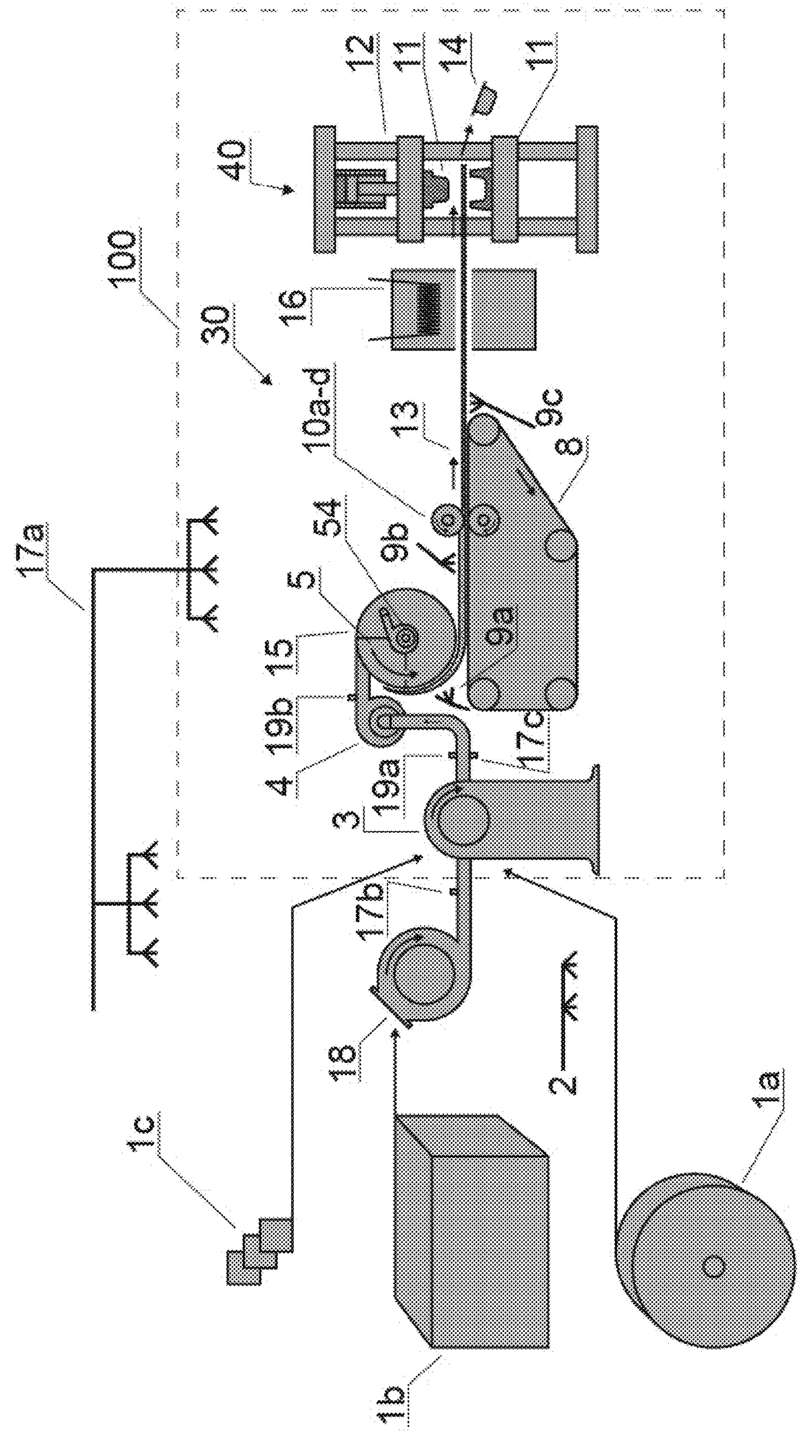
FIG. 1*a* is a schematic illustration of one example embodiment of an apparatus for dry manufacturing rigid cellulose products having essentially non-flat general shape from cellulose fibres.
Figure 1B:
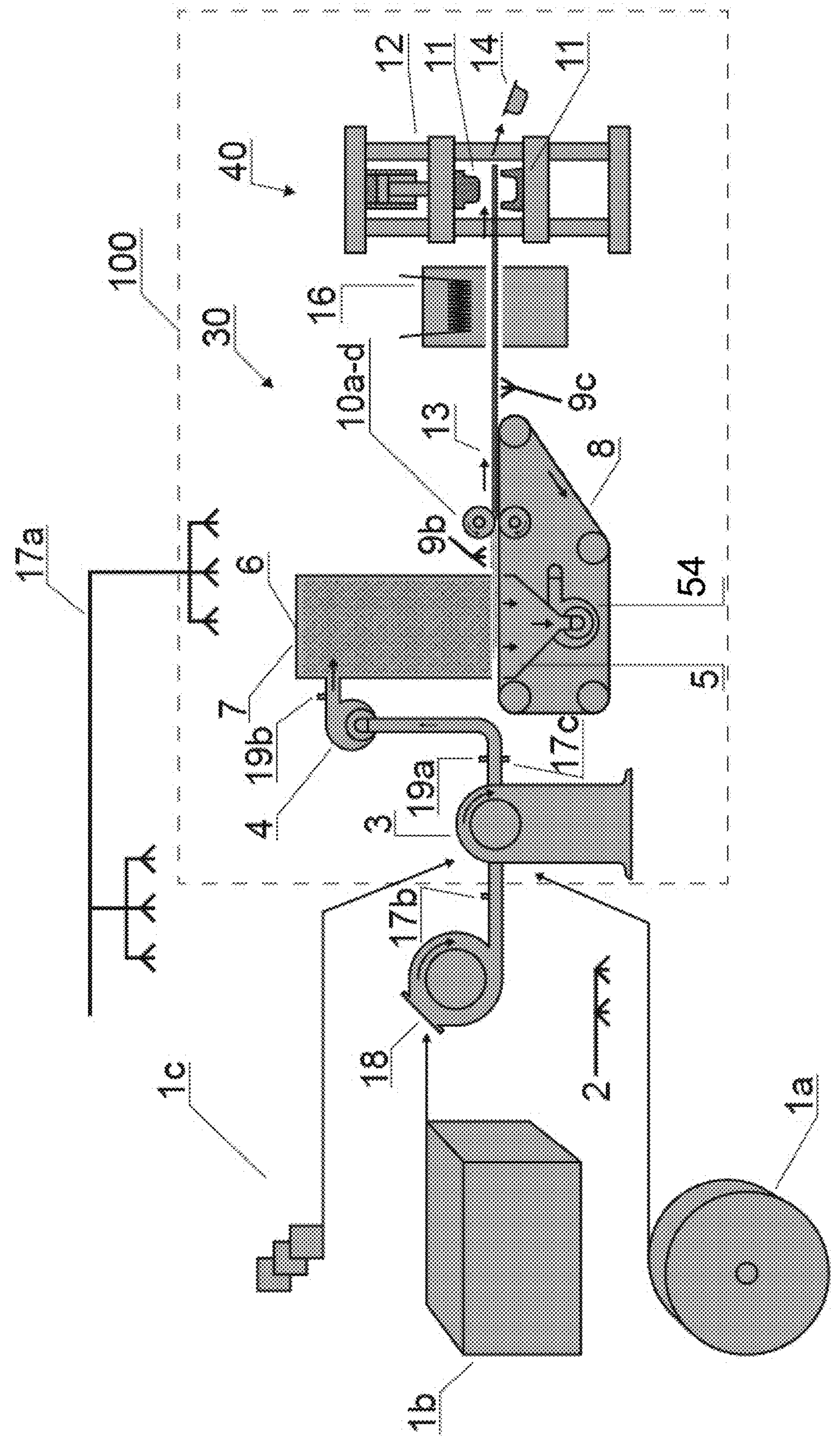
FIG. 1*b* is a schematic illustration of one example embodiment of an apparatus for dry manufacturing rigid cellulose products having essentially non-flat general shape from cellulose fibres.

FIGS. 1*a*-1*b* disclose various example embodiments of an apparatus for dry manufacturing rigid cellulose products, generally designated 100, for manufacturing cellulose products 14 having essentially non-flat general shape from cellulose fibres, according to the present invention. The embodiments of the different figures may be combined.

The inventive apparatus 100 will be generally described with reference to FIG. 1*a*, wherein said apparatus 100 comprises a separating/disintegrating unit 3, a cellulose blank/sheet forming unit 30 and a final product forming unit 40. Cellulose raw material 1 is fed to the separating/disintegrating unit 3. The cellulose raw material 1 may be in the form of reeled pulp or paper 1*a*, bale of cellulose pulp, paper, etc. 1*b* and/or sheets of paper, cellulose pulp, etc. 1*c*. In case said cellulose raw material 1 is in the form of sheets 1*c* and/or reeled pulp or paper 1*a* it can be fed directly into the separating unit 3. However, in case said cellulose raw material 1 is in the form of a bale 1*b* or compact stacks of sheets 1*c*, etc. one or more shredders 18 and/or one or more additional separating/disintegrating units 3 may be necessary to be used for separating and dosing said cellulose raw material 1 from said bale 1*b* or sheets 1*c* in smaller quantities. The shredder(s) 18 prepare cellulose raw material 1 to be accepted by said separating unit 3. The separating unit 3 disintegrates the cellulose raw material 1 into separated cellulose fibres. Said one or plurality of shredder(s) 18 are arranged before said one or a plurality of separating unit(s) 3, so that an output of one of said shredder 18 is connected to an input of one of said separating units 3. The shredders 18 may be arranged in parallel to each other or in series with each other, and the disintegrating units 3 may be arranged in parallel to each other or in series with each other. The shredders 18 and the disintegrating units 3 together constitute a cellulose fibre separating unit, arranged upstream the cellulose blank forming unit 30.

Said cellulose fibres may be constituted by virgin cellulose fibres and/or recycled cellulose fibres and may originate from wood pulps such as kraft pulp, sulphite pulp, mechanical pulp, thermomechanical pulp (TMP), chemical treated mechanical pulp, chemi-thermomechanical pulp (CTMP), and/or from non-wood pulps such as bagasse, bamboo, abaca, hemp, flax, cotton.

The separating unit 3 may according to various embodiments be constituted by a hammer mill. In said separating unit 3 the cellulose raw material is separated into fibres having a normal length in the range of 0.5-70 mm. The length of said fibres may be customized by adjusting the internal properties of the separating unit 3 and/or by choosing a different separating unit 3 and/or choosing different cellulose raw material. The fibre length for wood pulp is according to various embodiments in the range 0.5-4 mm, preferably in the range 1.7-3.6 mm. According to various embodiments the fibre length for non-wood pulp is in the range 0.5-70 mm.

In an air/dry-forming/air/dry-laid method, in general, wood pulp fibres are individualized/separated using, for example, a hammer mill, transported by an air stream to a dispenser that distributes the fibres substantially uniformly in the transverse direction of the production apparatus. The fibres are laid on a moving perforated surface using the air flow created by the vacuum/low-pressure chambers below the surface. As described above, the cellulose fibre carrying air flow may be generated by suitable device located upstream and/or downstream the perforated surface.

In FIG. 1*a* the individualized/separated cellulose fibres are fed to the cellulose blank/sheet forming unit 30. The cellulose blank forming unit 30 comprises in the schematic/general embodiment disclosed in FIG. 1*a* a fan 4, a forming drum/cylinder 15 and a support structure/web 8. The fan 4 is arranged in-between said separating unit 3 and said forming cylinder 15, and the disintegrating unit 3 is connected to the fan 4. Said fan 4 generates a cellulose fibre carrying air flow and blows said cellulose fibres from said separating unit 3 onto an outer surface of said forming cylinder 15 via a dispenser extending between the disintegrating unit 3 and the forming cylinder 15. According to various example embodiments the application of said fibres onto said forming cylinder 15 is performed at an angle with respect to the outer surface of said forming cylinder 15. According to various example embodiments said angle is 90°, i.e. the fibres are applied perpendicular to the outer surface of said forming drum/cylinder 15. According to various example embodiments said angle is smaller or larger than 90°, i.e. the cellulose fibres are applied non-perpendicular to the outer surface of said forming drum/cylinder 15. A predetermined angular interval 5 of said forming cylinder 15 may be provided with vacuum/low-pressure condition. The forming drum 15 is rotating continuously and at a predetermined speed, and the angular interval 5 is stationary. Thus the outer surface of the forming drum 15 passes said angular interval 5.

Separated cellulose fibres may be flowing with a fibre/air concentration of approx. 500 g cellulose fibre per cubic metre air, and the moisture content of the air is 5-20 g water/kg air in the separating unit 3 and/or in the cellulose blank forming unit 30. The fibre/air concentration may be less than 100 g cellulose fibre per cubic metre air, and more than 20 g cellulose fibre per cubic metre air, preferably in the range 25-30 g cellulose fibre per cubic metre air.

The outer surface of the forming cylinder 15 is perforated. In order to apply said cellulose fibres with air onto the outer surface of the forming drum/cylinder 15, the air inside the forming drum 15 must be removed in the angular interval 5, and the cellulose fibres stay attached onto the outer surface having perforations, i.e. the cellulose fibres are sucked against the outer surface of the forming drum 15. The air is removed by means of an air removing device 54 arranged inside the forming drum 15, i.e. at least a part of the air removing device 54 is arranged inside the forming drum 15. The air removing device 54 is configured to remove at least the same amount of air introduced by the fan 4 generating the cellulose fibre carrying air flow. Thereby the separated cellulose fibres will attach/accumulate to the outer surface of the forming drum 15 at the locations having perforations. When the cellulose fibres accumulate at the outer surface of the forming drum 15 the cellulose blank 13 is formed. The amount of cellulose fibres in the air flow from the fan 4, the air flow speed from the fan 4, the speed of the outer surface of the forming drum 15, the perforation density of the outer surface, etc. determine the grammage of the cellulose blank 13 formed. Alternately, the air removing device 54 also perform the task of the fan 4 and is thereby the single device generating the cellulose fibre carrying air flow.

The cellulose blank 13 is removed from the forming cylinder 15 and is applied to or received by the support structure/web 8. For that reason, only said predetermined angular interval 5 of said forming cylinder 15 have said vacuum/low-pressure condition. The angular interval 5 is overlapping the air flow from said fan 4. The vacuum condition is released/terminated in advance of a closest position of said outer surface of said forming cylinder 15 to said support structure 8, i.e. a transfer/release point between the forming drum and the support structure, thereby allowing said cellulose blank/sheet 13 to be released from said forming cylinder 15 and applied onto said support structure 8. The support structure 8 may be as depicted in FIG. 1*a* a continuous web or continuous belt. The rotational/surface speed of said forming cylinder 15 may be synchronised with the speed of said support structure 8. A fan 54 may be provided in order to create under pressure inside said forming cylinder 15 at the angular interval 5.

The cellulose blank/sheet 13 applied onto said support structure 8 may pass one or a plurality of compression rolls 10*a-d* in order to compress said cellulose blank/sheet 13 having a first thickness into a cellulose blank/sheet 13 having a second thickness, where said second thickness is thinner than said first thickness. The compression rolls 10 are illustrated downstream the forming drum 15 and upstream the product forming unit 40. The compression rolls 10 may compress the air laid cellulose blank 13 to at least a half of its initial/uncompressed thickness. According to various example embodiments the compression rolls 10 are compressing the cellulose blank 13 to at least a third of its initial/uncompressed thickness. The cellulose blank 13, compressed or uncompressed, may be fed into a product forming unit 40. The product forming unit 40 comprises in FIG. 1*a* a press unit 12 having a moulding tool 11. The moulding tool has a male portion and a corresponding female portion comprising the design/structure of the final rigid cellulose product having essentially non-flat general shape. In FIG. 1*a* an optional pre-heating unit 16 may be arranged upstream the press unit 12. According to various example embodiments said cellulose blank 13 having said second thickness may be heated to an elevated temperature before being fed into the press unit 12 of the product forming unit 40. In such embodiment(s) where the cellulose blank 13 is preheated before being fed into the press unit 12 of the product forming unit 40, said moulding tool 11 may or may not comprise heating. According to various example embodiment said moulding tool 11 in said press unit 12 may be a heated moulding tool 11 for heating said cellulose blank while forming said final rigid cellulose product 14. In the case of a heated moulding tool 11, a preheating of said cellulose blank 13 with said pre-heating unit 16 is optional. According to various example embodiments a preheating of the cellulose blank 13 in said pre-heating unit 16 may be combined with a heated moulding tool 11. In such case one may heat the cellulose blank 13 to a first temperature by said pre-heating unit 16 whereas the moulding tool 11, while pressing/forming said final rigid cellulose product 14, may be heating said cellulose blank 13 to a second temperature. Said first and second temperature may be different or equal. According to various example embodiments a preheating may be performed to reach an intermediate temperature whereas the final temperature is elevated by said moulding tool 11. The intermediate temperature may be in between the final temperature and room temperature. According to various example embodiments said intermediate temperature may be close to the final temperature. Having a pre-heating unit 16 in combination with a heated moulding tool 11 will speed up the manufacturing process in the press unit 12, and improve the quality/rigidity of the final rigid cellulose product 14. The pre-heating unit 16 may heat from one side, top or bottom, or from both sides, top and bottom, of the cellulose blank 13. The moulding tool 11 may have one or both of said male portion or female portion heated, and/or the male portion and the female portion may have different temperature. The optional pre-heating unit 16 may be an IR heater or a resistive heater with or without a fan.

In said moulding tool 11 said cellulose blank 13 is heated to a temperature of 120-200° C. in order to obtain adequate rigidity and strength in the final cellulose product 14. According to various example embodiments the cellulose blank 13 may be preheated to 100° C. prior to reaching the press unit 12 of the product forming unit 40 and in the press unit 12 the cellulose blank is heated to 120-200° C. by said moulding tool 11. According to various example embodiments the cellulose blank is heated to 120-200° C. by said pre-heating unit 16 and no extra heat is delivered to the cellulose blank during the moulding of the final cellulose product 14. According to various example embodiment the heating of the cellulose blank 13 is only taking place in the press unit 12 of the product forming unit 40 during the forming of the final cellulose product 14, i.e. without preheating.

The compression rolls 10*a-d* may be provided with an imprinting pattern 172-175 for compressing/imprinting the cellulose blank 13. A cellulose blank may be imprinted at the same time as the full area of the cellulose blank is partially compressed. An imprinted and optionally partially compressed cellulose blank 13 may be an output from the compression rolls 10*a*-10*d*, to be fed to the press unit 12. The cellulose blank 13 may be continuous or discontinuous.

Figure 2A:
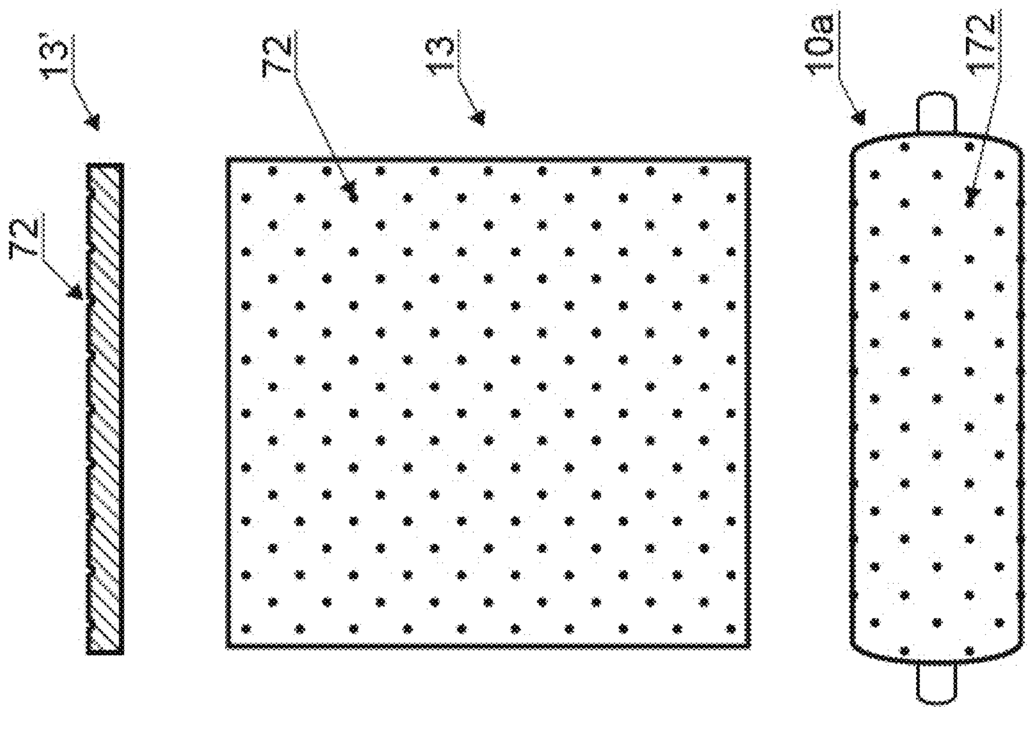
FIGS. 2*a-d* are schematic illustrations of various example embodiments of imprinting tools and the resulting imprinted pattern in the cellulose blank.

FIG. 2*a* disclose a compression roll 10*a* with a point/dot imprinting pattern 172. In FIG. 2*a* the imprinting points are provided in an evenly distributed imprinted pattern with equal size of the imprint points/dots. In alternative embodiment the imprinted pattern may be unevenly distributed and/or the imprinting points may have different size and/or shape. Above the compression roll 10*a* in FIG. 2*a* is disclosed in a view from above a resulting cellulose blank 13 having the imprinted pattern 72. The top portion in FIG. 2*a* disclose a cross sectional area of the cellulose blank 13' having the imprinted pattern 72.

Figure 2B:
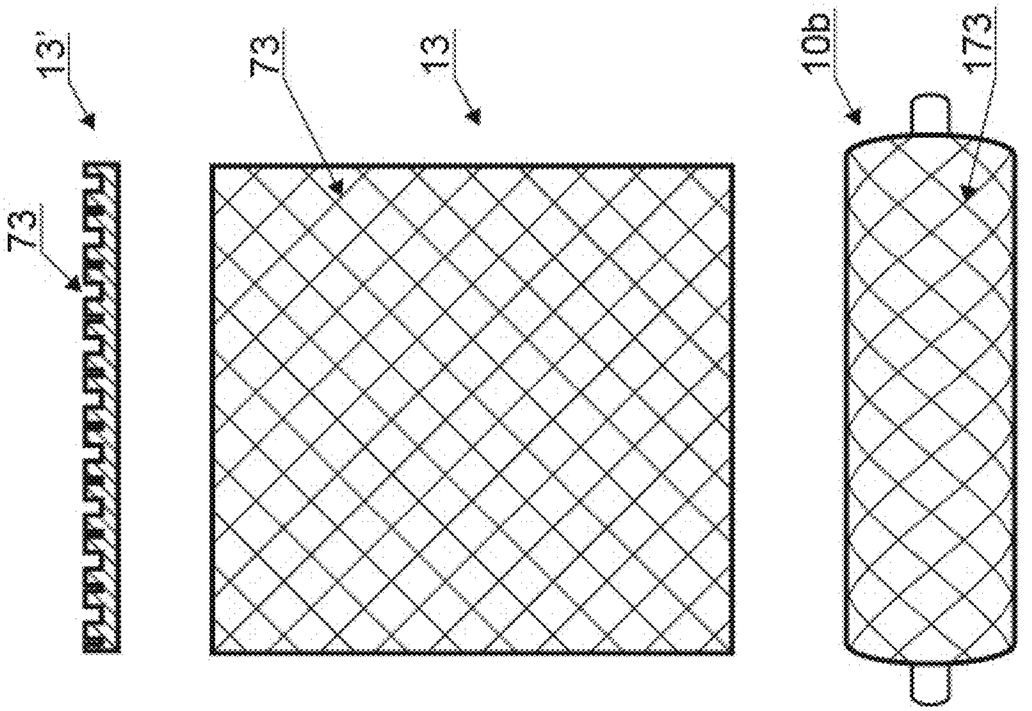

FIG. 2*b* disclose an alternative embodiment of a compression roll 10*b* having another imprinting pattern 173. This imprinting pattern is in the form of a regular network of crossing lines, straight or curved. Here again the lines may vary in imprinting depth, size and location throughout the compression roll in order to create a repetitive irregular imprinted pattern. Above the compression roll 10*b* in FIG. 2*b* is disclosed in a view from above a resulting cellulose blank 13 having the imprinted pattern 73. The top portion in FIG. 2*b* disclose a cross sectional area of the cellulose blank 13' having the imprinted pattern 73.

Figure 2C:
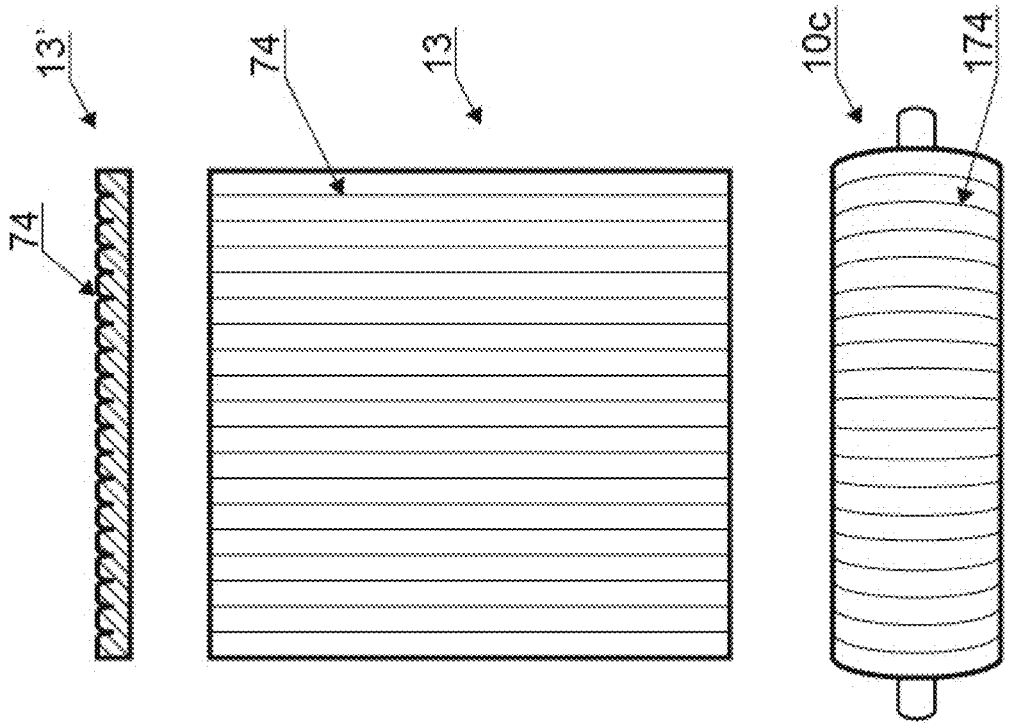

FIG. 2*c* disclose still an alternative embodiment of a compression roll 10*c* having another imprinting pattern 174. This imprinting pattern is in the form of a pattern of lines, straight or curved. Here again the lines may vary in imprinting depth, size and location throughout the compression roll in order to create a repetitive irregular imprinted pattern. Above the compression roll 10*c* in FIG. 2*c* is disclosed in a view from above a resulting cellulose blank 13 having the imprinted pattern 74. The top portion in FIG. 2*c* disclose a cross sectional area of the cellulose blank 13' having the imprinted pattern 74.

Figure 2D:
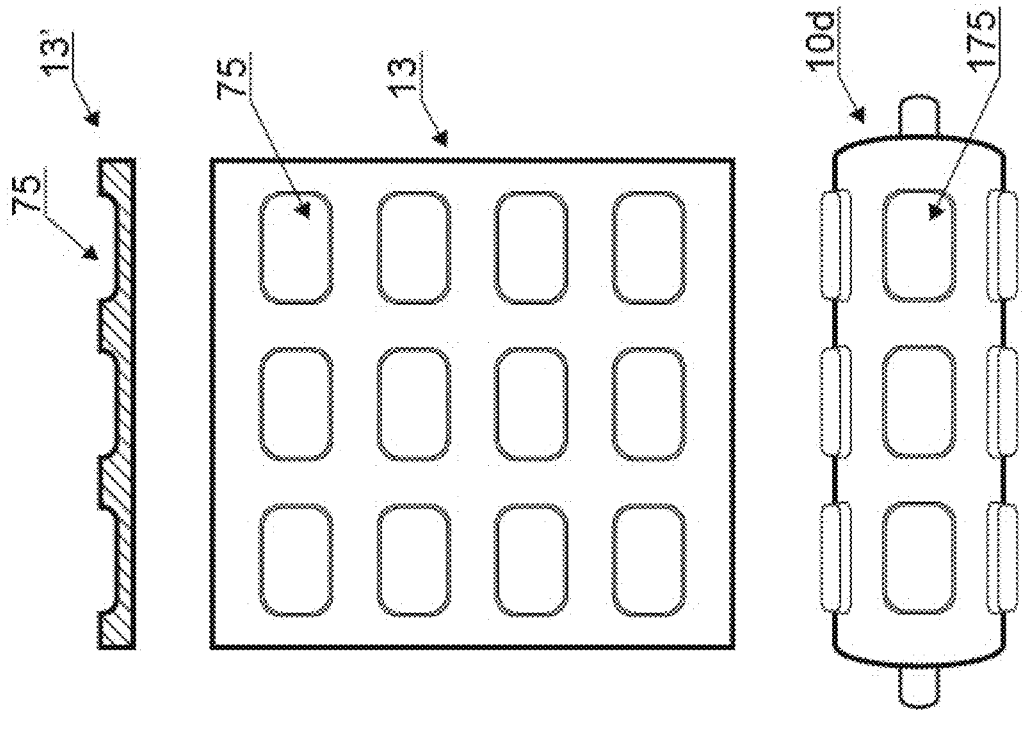

FIG. 2*d* disclose yet another alternative embodiment of a compression roll 10*d* having another imprinting pattern 175. This imprinting pattern is in the form of a regular pattern of square like protrusions. Here again the protrusions may vary in imprinting depth, size and location throughout the compression roll 10*d* in order to create a repetitive irregular imprinted pattern. Above the compression roll 10*d* in FIG. 2*d* is disclosed in a view from above a resulting cellulose blank 13 having the imprinted pattern 75. The top portion in FIG. 2*d* disclose a cross sectional area of the cellulose blank 13' having the imprinted pattern 75.

Figure 3:
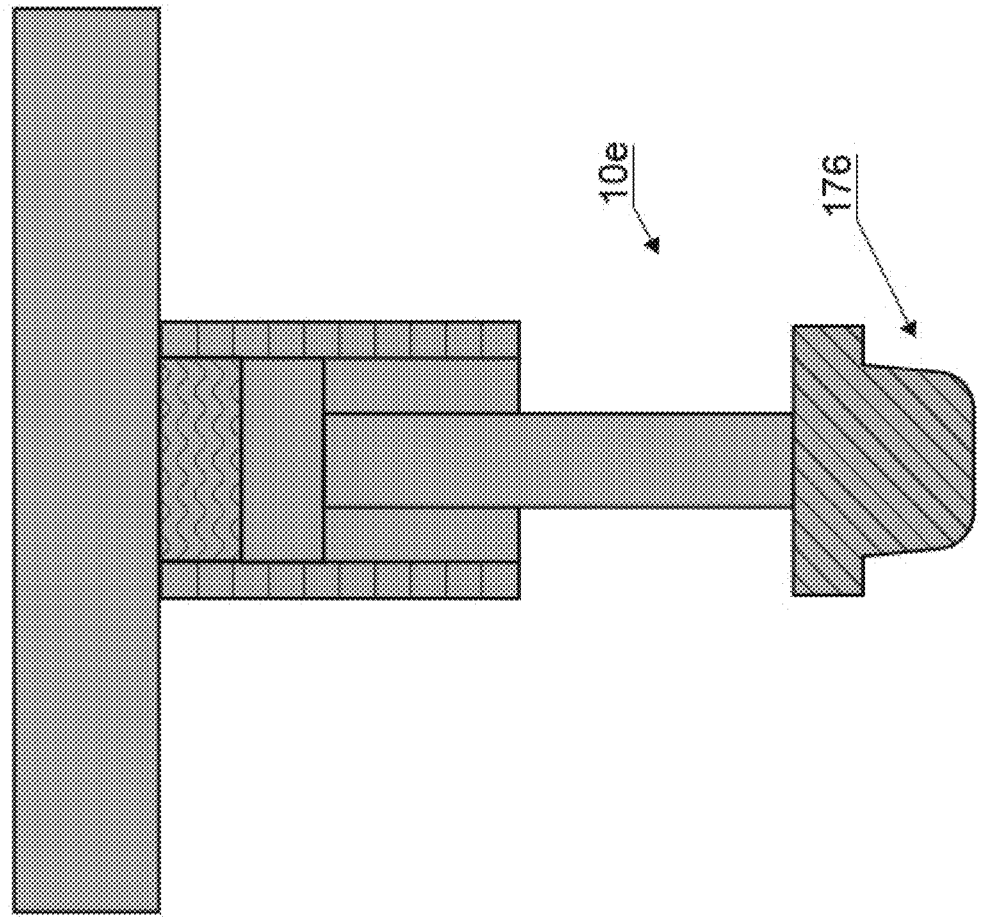
FIG. 3 is a schematic illustration of an example embodiment of another imprinting tool.

Instead of using compression rolls for making an imprinting pattern on the cellulose blank 13 one may use one or a plurality of stamping tools having a stamping pattern to be provided onto the cellulose blank. In FIG. 3 an example embodiment of such a stamping tool 10*e* is depicted. The tool is configured to move up and down for imprinting a cellulose blank with an imprinted pattern 176. The stroke, location, shape and number of stamping tools will determine the final imprinted pattern onto the cellulose blank.

According to various example embodiment said imprinted pattern may cover equal to or more than 10% and equal to or less than 70% of the total area of the cellulose blank. According to various example embodiments said imprinted pattern covers equal to or more than 20% and equal to or less than 60% of the total area of the cellulose blank.

The imprinted pattern may be provided only on predetermined areas of the cellulose blank corresponding to crack prone areas of the pressed rigid cellulose product 14 during the step of producing the rigid cellulose product 14 having essentially non-flat general shape. In such case the imprinting pattern in said compression roll 10*a-d* and/or said stamping tool 10*e* may be determined based on the final rigid cellulose product to be manufactured. Thus, providing partially compressed/imprinted locations to the cellulose blank such that at the partially compressed/imprinted locations there is an increased internal bonding between individual cellulose fibres preventing mutual separation/displacement of cellulose fibres during the pressing step that otherwise might lead to cracks in the final rigid cellulose product. At the same time, the locations of the cellulose blank not being partially compress/imprinted have less internal bonding between individual cellulose fibres entailing that such locations are more formable during the pressing step.

According to various example embodiments said compression roll 10*a-d* and/or said stamping tool 10*e* may be heated while forming/generating said imprinted pattern onto said sheet of cellulose fibre. The temperature may be in the range of 120-200° C. According to various example embodiments signs of the imprinted pattern will remain in the final cellulose product having essentially non-flat general shape. The sign of the imprinted pattern may be in the form of heating marks and/or texture marks.

The cellulose blank 13 reaching said compression roll and/or said stamping tool, may have uniform thickness and/or grammage weight, or may have non-uniform thickness and/or grammage weight. The cellulose blank 13 reaching said compression roll and/or said stamping tool, may be generated by stacking two or more cellulose blanks 13 on top of each other.

The apparatus 100 may be provided with one or a plurality of optional humidifier units 17*a-c*. According to various example embodiments a first humidifier unit 17*a* may be arranged to humidify the surrounding air in the production site and/or an interior volume of the apparatus 100 for ensuring the correct humidity of the cellulose fibres, especially in the disintegrating unit 3 and/or in the cellulose blank forming unit 30. According to various example embodiments a second humidifier 17*b* may be arranged prior to the separating/disintegrating unit 3, i.e. at the inlet to said separating unit 3, for humidifying the cellulose raw material entering the separating unit 3. According to various example embodiments a third humidifier 17*c* may be arranged at an outlet of said separating unit 3 for humidifying the cellulose fibres being ejected from said separating unit 3. The third humidifier 17*c* may be arranged at an inlet of the fan 4 provided for extracting fibrous material from the separating unit 3 and spraying the same fibrous material onto said forming cylinder 15. The third humidifier may also be arranged at said fan 4 for blending incoming air and fibrous material with a desired humidity before laying the cellulose fibres onto the forming cylinder 15. The humidifier 17*a*, 17*b*, 17*c* may provide water in liquid and/or gaseous form. The humidifier 17*b* and 17*c* may alternatively be used to provide other additives/chemicals than water, in liquid and/or gaseous form.

The cellulose blank requires a moisture content within a predetermined range. The moisture content of the air is 5-20 g water/kg air in the separating unit 3 and/or in the cellulose blank forming unit 30. According to various example embodiments the moisture content of the air is 9-12 g water/kg air in the separating unit 3 and/or in the cellulose blank forming unit 30. A too low moisture content of the cellulose fibres will result in increased risk of static electricity which will result in uneven cellulose blank formation and thereby affect the grammage of the cellulose blank. A too high moisture content will result in flocculation of the cellulose fibres and thereby affect the grammage of the cellulose blank.

According to various example embodiments one or plurality of optional chemical dosing units may be provided configured for increasing the network strength of the cellulose blank 13. In a first example embodiment at least one first chemical dosing unit 9*a-c* may be provided for applying a liquid binding agent onto a bottom or top surface of said cellulose blank for forming a support layer. Thereby, the final cellulose product 14 may in response thereto be a layered product, wherein the different layers may have different properties/characteristics and thickness. According to various embodiments the liquid binding agent may be added to the cellulose raw material before the disintegrating unit 3 and/or to the separated cellulose fibres after the disintegrating unit 3. Thereby the entire final cellulose product may have uniform properties/characteristics.

The final cellulose product 14 is formed in the press unit 12 of the product forming unit 40. The pressure by said press unit 12 onto said moulding tool 11 may be between 40-10000N/cm$^2$. According to various example embodiments said pressure may be between 100-4000N/cm$^2$. According to various example embodiments said pressure is above 400 N/cm$^2$, preferably between 1000-3900N/cm$^2$. According to various example embodiments said pressure is below 2000 N/cm$^2$ According to various example embodiments said cellulose fibre may be coloured by providing a colouring agent after said separating unit 3 but before forming said cellulose blank 13 on said forming cylinder 15 and/or said support structure 8. Said colour may be provided by introducing a liquid solution of colour to be mixed with said separated cellulose fibres and/or by introducing dry pigment to be mixed with said separated cellulose fibres. The colour may be introduced directly after said separating unit 3 but before said fan 4 or alternatively after the fan 4 but before the forming cylinder 15 or said formation unit 7. Colour in liquid form may be sprayed into the manufacturing apparatus after the separating unit 3 with high or low pressure for creating predetermined size of liquid droplets to be mixed with the free-flowing cellulose fibres, such as aerosol, mist, or wet gas. Colour may be injected by one or a plurality of injector having at least a portion of a colour spray flow in a direction opposite to a flow direction of cellulose fibres in order to increase the mixing capability. The spray pattern of one or a plurality of injectors may fill up the full cross-sectional area of the flow path of said cellulose fibres in order to increase the mixing capability. One or a plurality of injection nozzles may be provided for introducing colour to be mixed with the cellulose fibre. The colour may be heated before introduced to be mixed with the cellulose fibres in order to increase the mixing capability and colouring effect of the injected colour. In alternative embodiments said colour may be injected in the form of dry colour powder. The humidity of the cellulose fibres will colour the fibres when getting in contact with said dry powder. In case of using dry colour powder it may be necessary to increase the humidity to a level above the desired humidity before said cellulose fibres are mixed with said dry colour powder in order for the coloured cellulose fibre to reach a desired humidity level when forming said sheet of cellulose fibre and when forming said final product. One or more sensors may be used to control the degree of colouring of the final product. Any deviation from a desired degree of colouring may result in an increase or decrease of injected colour in order to reach the desired degree of colouring. A colouring unit may comprise one or a plurality of injection nozzles, a reservoir of colour, a pump unit for retrieving colour from said colour reservoir and providing it to said at least one injection nozzle and a control unit for controlling the pump and/or said at least one injection nozzle. The injection nozzle may be of a passive type having a fixed size open orifice for providing colouring agent into the flow of cellulose fibre. The amount of colour in such case is determined by the size of said orifice and the pressure of said colouring agent through said orifice. In an alternative embodiment said injection nozzle may be of the same type used in fuel injection internal combustion engines where the amount is controlled by the duty time of said nozzle, which may be from 0-100%, i.e. intermittent operation comprising ON and OFF periods or continuous operation. Duty time and pressure of the colouring agent determines the amount of colouring agent that is provided into the flow of cellulose fibre. The colouring agent may be of cationic type or anionic type. The colouring agent may be provided with a glitzy agent for making the final product glitzy.

According to various example embodiments an optional liquid or a solid agent may be applied onto the cellulose material before the forming/moulding step for altering the hydrophobic and/or oleophobic characteristics/properties of the essentially non-flat cellulose product 14. In FIG. 1*a*-*b* it is exemplified by a second chemical dosing unit 2 which applies a liquid agent onto the reeled pulp/paper 1*a* or pulp/paper sheets 1*c* before it enters the separating unit 3. The liquid or solid agent for altering hydrophobic and/or oleophobic properties/characteristics of the essentially non-flat cellulose product 14 may be starch compounds, rosin compounds, butantetracarboxylic acid, gelatine compounds, alkyl ketene dimer (AKD), alkenyl succinic anhydride (ASA), wax compounds, silicon compounds and/or calcium compounds, and may be added as 0.2-15% dry content, preferably 0.5-12% dry content. In various example embodiments the moisture content of the cellulose blank 13 may be at least 5% when said cellulose blank is provided into said moulding tool 11. According to various example embodiments said moisture content of said cellulose blank 13 may be between 7-12% when said cellulose blank is provided into said moulding tool 11.

FIG. 1*b* depicts schematically a second example embodiment of an apparatus dry for dry manufacturing rigid cellulose products having essentially non-flat general shape from cellulose fibres according to the present invention. The only difference between FIG. 1*a* and FIG. 1*b* is the way said cellulose blank is made/generated. In FIG. 1*b* the separated cellulose fibres 6 from the separating unit 3 may be fed into a formation unit/tower 7 instead of as in FIG. 1*a* onto a continuous forming cylinder 15. Separated fibres 6 may be fed into the formation unit 7 by at least one fan 4 arranged between said separating unit 3 and said formation unit 7. Separated fibres 6 fed into the formation unit may be drawn towards a bottom section by a vacuum/low-pressure container 5. The formation unit 7 may be arranged above said continuous web 8 onto which said separated fibres 6 may be arranged for forming the cellulose blank 13. Directly below said formation unit 7 and on an underside of said continuous web 8 said vacuum/low-pressure container may be arranged for removing air fed into the formation unit by fan 4. At least one vacuum fan 54 is provided for removing the air from the formation unit 7. As the continuous belt is moving, a cellulose blank 13 of a predetermined thickness is arranged onto a top surface of said continuous web 8. The speed of said continuous web in combination with the amount of separated fibres per unit air volume will determine the thickness of the cellulose blank 13.

In FIG. 1*a* and FIG. 1*b* the product forming unit 40 has a fixed press unit 12 with a single moulding tool 11 for manufacturing one or a plurality of three-dimensional rigid cellulose products 14 in a single mould. According to various embodiments the apparatus 100 may comprise a plurality of parallel press units 12 and/or parallel moulding tools 11.

The cellulose blank 13, continuous or discontinuous, is formed in an air laid process in a cellulose blank forming unit 30. Separated cellulose fibres may be flowing with a fibre/air concentration of less than 500 g fibre/m3 air and with a moisture content of the air of 5-20 g water/kg air in the separating unit 3 and/or in said cellulose blank forming unit 30. The fibre/air concentration may be a low as 5 g fibre/m3 air. The cellulose raw material may be in reeled, sheeted or flash dried pulp material. Other suitable raw material may be virgin and/or recycled paper and/or virgin and/or recycled carton board. Chemical additives may be provided to the cellulose fibre prior to the product formation unit 40 in liquid or solid form for amending the properties of the final product 14. In various example embodiments AKD or other chemical hydrophobic agent may be added with 0.02-5% as dry content. Chemical additives for achieving oil resistance and/or water resistance of the final product 14 may be waxes and/or PFAS (Perfluorooctanoic acid). Increased final product 14 strength and/or rigidity may be achieved by adding starch, vegetable gums, CMC, synthetic and/or natural polymers, modified cellulose, MFC, NFC and/or lignin. The final product may be single use products such as packaging containers (primary or secondary) such as food packaging for short and/or long shelf life, cosmetics, dairy products or consumer goods such as tooling, electronics or jewellery.

A uniform sheet of cellulose fibre requires a inter alia a moisture content within a predetermined range. As mentioned above the moisture content of the air of 5-20 g water/kg air in the separating unit 3 and/or in said cellulose fibre sheet forming unit 30 may be required. In various example embodiments the moisture content of the air of 9-12 g water/kg air in the separating unit 3 and/or in said cellulose fibre sheet forming unit 30. The amount of added water is equal to or more than 1 g water/kg air, during some environmental preconditions. Too low moisture content of the cellulose fibres will result in increased risk of static electricity which will lead to flocs of cellulose fibres which will result in uneven cellulose fibre sheet formation. Too high moisture content will result in moisture bound fibers that may clog the mesh/surface of the forming drum and/or cause build-up in the mill and/or in the arrangement transporting the air and fibre mix, e.g. the forming pipe/dispenser and thereby also affect the even sheet formation. The periphery speed in the separating unit may be in the range of 25-150 m/s. In various example embodiments said periphery speed may be 90-150 m/s. According to various example embodiments the size of the cellulose fibres may be 2 mm and the amount of fibres per unit volume air may be 100 g fibre/m3 air with 9-12 g water/kg air. The support structure, continuous forming cylinder and/or the continuous web may have a width of 20-100 cm. In various example embodiments said width is 30-70 cm. The cellulose blank 13 may have a weight of 200-2000 g/m2, preferably in the range 400-800 g/m2. The pressure in the pressure unit may be in the range of 40-10000N/cm$^2$, preferably in the range 400-2000N/cm$^2$.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

The product formation unit 40 may be a continuous process where female and male portions are arranged on two rotating molding units. The rotation of the molding units may be synchronised with the feeding of said sheet of cellulose fibre into the product formation unit. The rotating molding units may have a plurality of forms for forming the three-dimensional product. Said rotating molding units may comprise a plurality of identical forms for forming identical three-dimensional products. Said rotating molding units may comprise a plurality of different forms for forming a plurality of different three-dimensional products. The rotation of the rotating molding units may bring forward the three-dimensional product out of the product forming unit and feed new sheet of cellulose material into the product formation unit.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

It shall be pointed out that the formation of the cellulose blank may be performed in other ways than the disclosed. For instance using a plurality of formation units, such as combination of formation tower and formation drum, a plurality of formation drums, etc., and or other types of formation units than the one disclosed in the drawings.

It shall be pointed out that the envelope surface of the imprinting/compression rolls may have the same material or different material, i.e. steel/steel, steel/rubber, rubber/rubber, and/or the same shape or different shape, i.e. one having imprinting pattern and one is smooth, both having imprinting pattern.

The invention claimed is:

1. A method for dry manufacturing rigid cellulose products having essentially non-flat general shape from cellulose fibres, the method comprising the steps of:

providing a quantity of separated cellulose fibres from a dry cellulose raw material in at least one separating unit, providing the separated cellulose fibres onto a support structure for forming a cellulose blank, producing a rigid cellulose product having essentially non-flat general shape by pressing the cellulose blank in a product forming unit having a moulding tool for forming the rigid cellulose product, and prior to the step of producing the rigid cellulose product having essentially non-flat general shape, imprinting the cellulose blank by providing an imprinted pattern onto the cellulose blank by means of at least one imprinting tool, the imprinted pattern defined by partially compressed/imprinted locations and locations not partially compressed/imprinted, the imprinted pattern operative to increase internal bonding between individual cellulose fibres at each partially compressed/imprinted location relative to the locations not partially compressed/imprinted to prevent mutual separation of the individual cellulose fibres during the pressing of the cellulose blank in the product forming unit.

2. The method of claim 1, wherein said imprinted pattern covers equal to or more than 10% and equal to or less than 70% of the total area of the cellulose blank.

3. The method of claim 1, wherein the imprinted pattern is provided only on predetermined areas of the cellulose blank corresponding to crack prone areas of the pressed rigid cellulose product during the step of producing the rigid cellulose product having essentially non-flat general shape.

4. The method of claim 1, wherein the imprinted pattern is evenly distributed over the area of the cellulose blank covered by the imprinted pattern.

5. The method of claim 1, further comprising the steps of:

heating the moulding tool while producing the rigid cellulose product; and/or heating the cellulose blank prior to producing the rigid cellulose product; and/or heating the imprinting tool.

6. The method of claim 1, wherein a thickness of the imprinted pattern is equal to or more than 20% and equal to or less than 70% of a maximum thickness of the cellulose blank.

7. The method of claim 1, wherein the cellulose blank has a thickness measured from a top surface of the cellulose blank to a bottom surface of the cellulose blank, in which after the step of imprinting the cellulose blank and prior to the step of pressing the cellulose blank in the product forming unit to form the essentially non-flat general shape, the thickness at the partially compressed/imprinted locations is less than the thickness at the locations not partially compressed/imprinted.

8. A rigid cellulose product having essentially non-flat general shape, produced by the method of claim 1, wherein:

the rigid cellulose product comprises cellulose fibres from a cellulose raw material constituted by virgin cellulose fibres or recycled cellulose fibres; and the cellulose fibres originate from wood pulps selected from the group consisting of: kraft pulp, sulphite pulp, mechanical pulp, thermomechanical pulp, chemical treated mechanical pulp, chemi-thermomechanical pulp, and non-wood pulps.

9. The rigid cellulose product of claim 8, wherein the non-wood pulps are selected from the group consisting of: such as bagasse, bamboo, abaca, hemp, flax, or cotton.

10. An apparatus for dry manufacturing rigid cellulose products having essentially non-flat general shape from cellulose fibres, the apparatus comprising:

a disintegrating unit for providing a quantity of separated cellulose fibres from a cellulose raw material in dry state;

a support structure configured for receiving the separated cellulose fibres and for forming a cellulose blank from the separated cellulose fibres;

a product forming unit having a moulding tool for producing the rigid cellulose product having essentially non-flat general shape by pressing the cellulose blank;

at least one imprinting tool located upstream of the product forming unit and configured for imprinting the cellulose blank with an imprinted pattern defined by partially compressed/imprinted locations and locations not partially compressed/imprinted, the imprinted pattern operative to increase internal bonding between individual cellulose fibres at each partially compressed/imprinted location of the imprinted pattern relative to the not partially compressed/imprinted to prevent mutual separation of the individual cellulose fibres during the pressing of the cellulose blank in the product forming unit.

11. The apparatus of claim 10, wherein the imprinting tool is configured to provide an imprinted pattern onto the cellulose blank covering equal to or more than 10% and equal to or less than 70% of the total area of the cellulose blank.

12. The apparatus of claim 10, wherein the imprinting tool is configured to provide an imprinted pattern only on predetermined areas of the cellulose blank corresponding to crack prone areas of the pressed rigid cellulose product during the step of producing the rigid cellulose product having essentially non-flat general shape.

13. The apparatus of claim 10, wherein the imprinting tool is configured to provide an imprinted pattern that is evenly distributed over the area of the cellulose blank covered by the imprinted pattern.

14. The apparatus of claim 10, wherein:

the moulding tool is configured to be heated during the step of producing the rigid cellulose product; and/or the apparatus is configured to heat the cellulose blank prior to producing the rigid cellulose product; and/or the imprinting tool is configured to be heated.

* * * * *